United States Patent [19]

Bremer, Jr.

[11] 4,262,553

[45] Apr. 21, 1981

[54] TORSIONAL VIBRATION DAMPER

[75] Inventor: Robert C. Bremer, Jr., Brownsburg, Ind.

[73] Assignee: Wallace Murray Corporation, New York, N.Y.

[21] Appl. No.: 872,754

[22] Filed: Jan. 27, 1978

Related U.S. Application Data

[62] Division of Ser. No. 664,381, Mar. 5, 1976, Pat. No. 4,083,265.

[51] Int. Cl.³ .............................................. F16F 15/10
[52] U.S. Cl. ...................................................... 74/574
[58] Field of Search ...................................... 74/574

[56] References Cited

U.S. PATENT DOCUMENTS

| | | | |
|---|---|---|---|
| 1,840,656 | 1/1932 | Breer | 74/574 |
| 2,152,710 | 4/1939 | Schwaiger | 74/574 |
| 3,075,405 | 1/1963 | Krebs | 74/574 |
| 3,077,123 | 2/1963 | Karenberger | 74/574 |
| 4,114,472 | 9/1978 | Hornig et al. | 74/574 |

*Primary Examiner*—Kenneth Dorner
*Attorney, Agent, or Firm*—Thomas J. Greer, Jr.

[57] ABSTRACT

A torsional vibration damper of the type having a hub which carries an outer inertia ring coupled thereto by an elastomer. Supplemental damping is added to the system via the use of dry friction. A broad frequency range of effectiveness is provided by designed non-linearity of the device made possible by the dry friction. A greater broadening of the frequency range of effectiveness is made possible by utilizing a plurality of inertia masses carried by the hub, all mounted on the same elastomer. Elastomeric compression is utilized to spring-load the friction surfaces, providing a series-parallel, elastomer viscous-dry friction damping medium. In multiple mass application the concept of mass interaction is utilized to further determine the dynamic performance of the damper.

11 Claims, 11 Drawing Figures

TORSIONAL VIBRATION DAMPER

This is a Division, of application Ser. No. 664,381 filed Mar. 5, 1976 (now U.S. Pat. No. 4,083,265).

This invention relates to torsional vibration dampers of the type having a hub secured to an outer inertia member by an elastomer annulus.

The invention exhibits particular utility to the damping of torsional vibrations in internal combustion engines. Such dampers are generally classified at present in Class 74, Sub-class 574 in the United States Patent Office. Torsional vibrations may be considered as back-and-forth twistings of the crankshaft of an internal combustion engine, superimposed upon the main, uni-directional rotation of the crankshaft. Unless controlled, such torsional vibrations will often lead to failure of the crankshaft, as well as contributing to failure in other parts of the engine or its cooling system, particularly where one of the resonant frequency modes of the crankshaft coincides with the particular firing frequency of the engine or a particular harmonic of that frequency. According to present theory of elastomer vibration dampers, the torsional vibrational energy transmitted to the crankshaft by the action of the pistons is converted into heat in the elastomer. The elastomer may accordingly be considered as a drain or sump which continually receives a portion of the energy which causes torsional vibrations.

A common form of such a damping device includes an outer or inertia member in the form of a ring or annulus of some significant mass. The inner portion of this ring is attached to an elastomer annulus which, in turn, is secured to a hub or other element in turn attached to the rotating crankshaft of an engine. Both the hub and the inertia members may be of cast iron. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibrations in the shaft. In a typical instance of torsional vibration, an engine crankshaft turning at a rate of 3000 r.p.m. simultaneously executes angular vibrations of an amplitude of from one-fourth degree to one degree at a frequency of 150 to 250 cycles per second.

The purpose of a torsional vibration damper is to reduce the amplitude of torsional vibrations. Such reduction lowers the strength requirements of the crankshaft and hence lowers the weight of the crankshaft. The damper has a direct effect on the crankshaft and also inhibits vibration of various other components of the internal combustion engine which are affected by crankshaft vibration.

As an internal combustion engine is operated at various engine speeds, several vibrational frequencies appear on the crankshaft. In general, most automotive and diesel engines of present design and not utilizing a torsional vibration damper have one fairly high amplitude resonant frequency within the engine operating range of speeds. However, at any given engine speed, torsional vibrations from various orders of vibration are present and can be significant.

The use of dry friction to damp vibration is known in this art. It is known to utilize dry friction alone as a damping medium, and in parallel with the viscous type damping medium available by distorting elastomeric type materials. Within the context and terminology of vibration dampers a parallel combination of damping mediums means the forces or torques transmitted through the two mediums are not equal, while in a series combination of damping mediums the forces or torques transmitted through the two mediums are always equal in a time averaged sense. The following examples are U.S. Pat. Nos. issued to cover dry friction alone as a damping medium: 1,670,369 issued to MacPherson; 1,967,446 issued to Meyer; 2,062,369 issued to Meyer; 1,840,655 issued to Breer; 1,840,656 issued to Breer; and 2,960,189 issued to Osburn. The three major disadvantages of a pure dry friction damper are: (1) the difficulty of maintaining radial concentricity between the inertial mass and the hub necessary to minimize the radial unbalance of a high speed rotating part, brought about by the mechanical requirement for a bearing surface between the two members; (2) an additional balance problem brought about by the fact that the inertial mass can vary its angular position relative to the hub and thus the overall balance of the part is allowed to vary continuously during operation; (3) and the limited amount of relative vibrational amplitude provided by pure dry friction contact between the inertial mass and the hub. The amount of energy absorbed by such a device is a function of the relative motion between the two major members, which in this case is limited to the magnitude of hub vibration, and then only at very high frequencies relative to the design frequency. The following are examples of U.S. Pat Nos. issued to cover dry friction employed in parallel with elastomeric type viscous friction: 1,984,579, issued to Griswold; 2,083,561, issued to Griswold; 2,153,914, issued to Christman; 2,383,400, issued to McFarland; 2,440,956, issued to Kearns; 3,020,739, issued to Roe; 3,075,405, issued to Krebs; and 3,077,123, issued to Katzenberger. The parallel application of elastomeric and dry friction damping mediums effectively solves the unbalance problems of pure dry friction dampers, but possesses the disadvantage of a poor low frequency response. At a given hub vibrational amplitude, and at frequencies below that which would produce inertia ring acceleration of significant magnitude to surpass the static or breaking torque of the contact dry friction surfaces, the inertia ring is locked into the hub, there is no relative motion between the inertia ring and the hub and thus no damping, and the damper is essentially a dead mass. Thus, in the parallel type elastomer-dry friction damper operating at acceleration below the breaking acceleration all of the inertia ring torque is being transmitted through the dry friction medium, with no torque passing through the elastomeric medium. U.S. Pat. No. 1,913,984 issued to Hann is an example of a pure series combination of elastomeric and dry friction damping mediums in that the forces generated by inertia mass vibration transmitted through the dry friction medium are equal to the force transmitted through the elastomeric medium on a time averaged basis. In a pure series deployment such as in Hann, in essence, a pure dry friction damper operates in series with an elastomer medium and all of the problems of a pure dry friction damper are still apparent.

The use of two seismic or inertia masses, each of different masses, is known in this art for the purpose of damping two particular frequencies. A parallel damper arrangement can thus be tuned to optimize damping for the two major resonant frequencies. A multiple mass damper can, similarly, damp multiple resonant frequency vibrations. In prior parallel dampers, such as shown at FIG. 3 of U.S. Pat. No. 3,075,405 to Krebs and FIG. 2 of U.S. Pat. No. 2,477,081 to Pierce, each inertia member is secured to the hub by its own separate elastomer member.

Again, U.S. Pat. No. 1,967,446, issued to Meyer, shows the two mass concepts designed to use dry friction as the damping medium. In general, prior art relating to more than one inertial mass employed in a vibration damper shows two employed masses essentially operating independent of one another utilizing pure elastomeric or dry friction damping mediums, or parallel combinations of the two mediums.

According to the practice of the present invention elastomeric and dry friction damping mediums are used together to produce a vibration damper. An elastomeric and dry friction medium are deployed in a series combination, and this combination then deployed in parallel with an elastomeric medium. The series combination produces a non-linear spring, and when used in parallel with an elastomeric medium provides the damper with a designed non-linear dynamic characteristic desirable in vibration applications. The combination retains the desirable characteristic of pure elastomeric and pure dry friction dampers, but eliminates the design limitation of each. The net result is a specific damping capability that is greater than either medium employed alone. In other embodiments a plurality of inertia masses are mounted on and carried by the same elastomer member. The entire damper is assembled in one step and utilizes the elastomer member cross-sectional geometry to provide axial integrity. A series rubber-dry friction medium is employed between masses to take advantage of the relative motion between individual masses as well as relative motion between the inertia mass and the hub member which is commonly utilized. In other embodiments a plurality of inertia masses are mounted on and carried by, again, the same elastomer member, and axially variable rubber radial deformation utilized to provide dry friction mass interaction to any degree desired, including no interaction. In another embodiment dry friction is employed in parallel with elastomeric damping medium to provide greater axial integrity. In general, the invention relates to utilizing dry friction and/or elastomeric damping mediums, in conjunction with single or multiple inertial masses to produce vibration dampers with a designed non-linearity to yield a wider effective frequency bandwidth than either medium alone or both mediums in simple parallel combination is capable of displaying.

IN THE DRAWINGS

Figure 1:
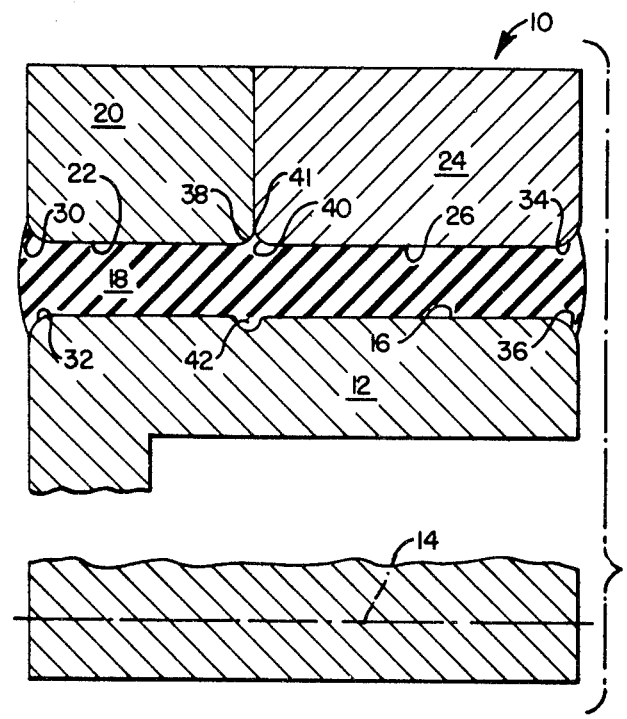
FIG. 1 is a partial cross-sectional view of a plural mass torsional vibration damper employing a common elastic member and no inertia member (mass) interaction.

Referring now to FIG. 1 of the drawings, the numeral 10 denotes generally a torsional vibration damper constructed in accordance with the practice of this invention and includes a hub member denoted by the numeral 12, the hub adapted to be coupled to a shaft (not illustrated) having an axis of rotation 14. The outer radial surface of the hub is denoted by the numeral 16, the hub carrying a continuous annular elastomer band denoted by the numeral 18. The numeral 20 denotes a first inertia ring (inertia member) having an innermost radial surface 22 which is in contact with the elastomer band. A second inertia ring is also carried by elastomer band 18, the inertia ring denoted by the numeral 24 and having an innermost radial surface 26. The numeral 30 denotes a rounded chamfer or assembly radius adjacent the left axial face of ring 20, the numeral 32 denoting a similar chamfer adjacent the left axial face of the hub. At the right axial face of the torsional vibration damper, assembly radii 34 and 36, of similar chamfer are also provided. The numerals 38 and 40 denote additional assembly radii at the innermost radial portion of the abutting faces of inertia rings 20 and 24. A continuous angular groove 41 is thereby defined and a corresponding groove 42, axially positioned at groove 41, is provided in the hub member. It will be understood that each of the several assembly radii is annularly continuous.

Elastomer 18 is under radial deformation (compression) and accordingly bulges somewhat at its two axial ends. The elastomer is usually adhesively bonded to both the hub member and to the inertia rings. Bonding techniques for carrying this out are well known in the art and form no part of this invention.

The operation of the damper illustrated at FIG. 1 is as follows. Torsional vibrations from the internal combustion engine are transmitted through the crankshaft to hub 12, the axis of rotation 14 often coinciding with the axis of rotation of the crankshaft. The hub 13 executes torsional vibrations, with cast iron inertia rings 20 and 24 lagging behind or out of phase therewith by virtue of the elasticity of elastomer material 18. In a manner well known to workers in this art, elastomer member 18 converts at least a portion of the energy attendant torsional vibrations into heat, thereby inhibiting the buildup of their amplitude to dangerously high levels.

At regions inwardly of annular surface 22 of ring 20 the elastomer is radially deformed, while at the left axial face and at grooves 41 and 42 there is little or no radial deformation because at these regions the elastomer is free to expand. Similarly, radial deformation of the elastomer is present along inner surface 26 of inertia ring 24 except at the axial ends of this inertia ring. Thus, radial deformation causes radial stress on the two inertia rings, except at the regions thereof which are immediately adjacent their axial ends.

Figure 2:
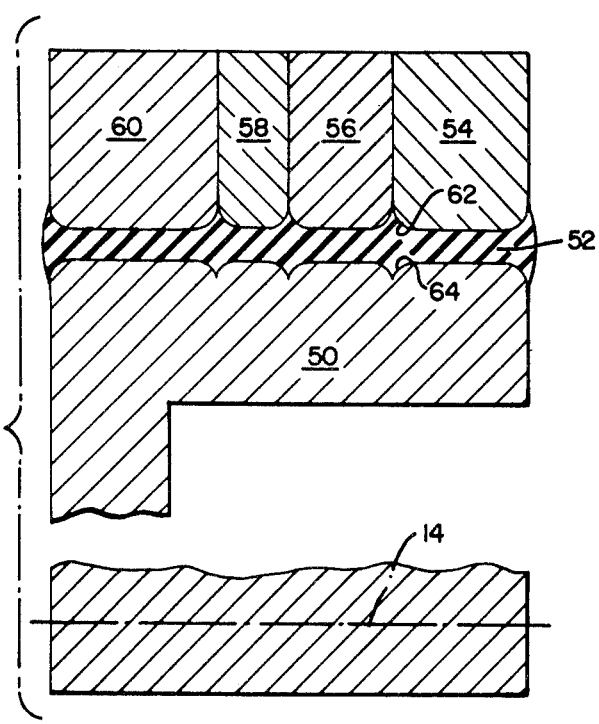
FIG. 2 is a view similar to FIG. 1 and shows an embodiment carrying four inertia members with no mass interaction.
Figure 9:
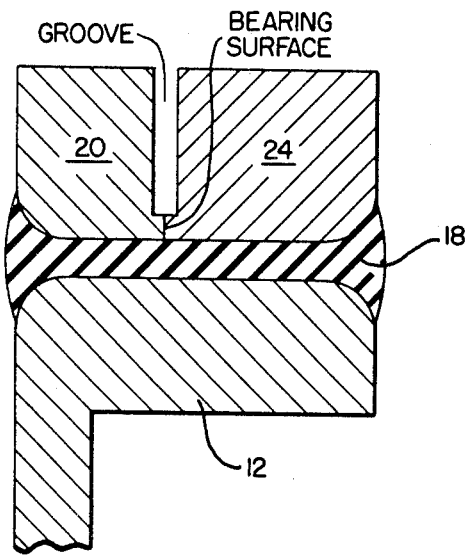
FIGS. 9 and 10 are similar to FIG. 1, and bear corresponding reference numerals, and illustrate zero mass interaction.
Figure 10:
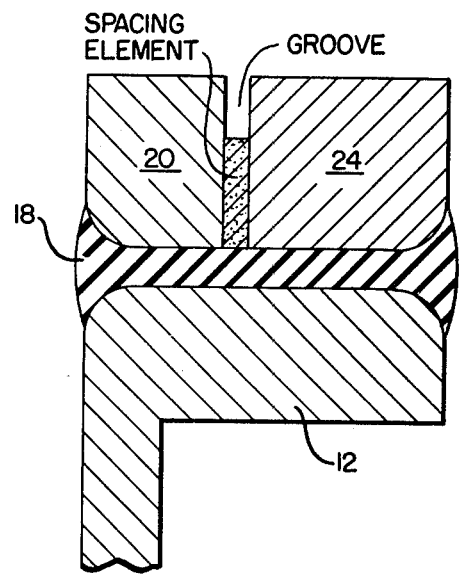

It should be understood that the specific geometrical shapes resulting in the annular grooves 41 and 42 are not constrained to be formed by the addition of various or single circular arcs as shown in FIG. 1. In practice, these grooves may take on a great many different shapes pursuant to consideration relative to ease of machining. The grooves may be geometrically similar as shown in FIG. 2 as 62 and 64, or dissimilar as shown in FIG. 1 as 41 and 42. The definitive criteria for the grooves simply specifies that the rubber be under near zero radial compression in the axial vicinity of the interface between various inertia members. It can be seen that near-zero radial rubber compression in the axial vicinity of the interface between masses results in rubber forces on the inertia rings than would generally tend to force these rings apart. The rings will not move axially in any significant amount because of the frictional or bonded restraint of the elastomer member, but the net result is a very low or near zero normal force between the inertia members. Since the general design criteria for a multiple mass vibration damper is that each mass exhibit a particular resonant frequency different from the resonant frequency of the other masses, each mass will in general be vibrating out of phase with all other masses, and therefore there will be during the operation of the damper relative back-and-forth motion between masses. If there is a normal force between masses this relative motion will cause a frictional drag between masses that tends to cause each mass to inhibit the motion of any adjacent masses. Thus, heat is generated at the interface between masses and vibrational energy is dissipated. This mass interaction is not always a quality that is desired in a multiple mass damper and the desirability for mass interaction is a function of the system for which the damper is designed. It is, in fact, a function of the embodiment shown in FIG. 1 to minimize this mass interaction via manipulation of elastomer radial compression near the interface between masses. Thus, the embodiment shown in FIG. 1 produces near zero mass interaction and will perform dynamically very nearly like two separate dampers with different resonant frequencies. The difference in resonant frequency is simply provided by a difference in rotational inertia between masses and/or a difference in rotational spring rate of the elastomer member brought about by the difference in axial width of that portion of the elastomer member directly associated with a given mass. The low or zero mass interaction between masses of a multiple mass damper utilizing a common elastic member can also be accomplished in the manner shown in FIGS. 9 and 10. In FIG. 9, a circumferential groove is cut in the interface between masses and no attempt is made to alter the rubber radial compression at the interface. Thus, the bearing surface between masses is minimized and therefore the frictional drag or mass interaction also is minimized. Zero mass interaction can be accomplished in a multiple mass damper utilizing a single elastic member as shown in FIG. 10 where a thin spacing element is provided during assembly that will thereafter disengage from the masses. This can be accomplished either by heating the spacer (such as a metal washer) prior to assembly, thus after assembly the element will axially contract as it cools and disengage contact between masses; or by making the spacer of some convenient material that will abrade quickly away at the onset of relative motion between masses, such as a soft graphite washer. The two inertia rings 20 and 24 each function to damp a specific torsional vibration frequency in a manner well known to workers and described in, for example, the noted patents to Krebs and Pierce.

Referring now to FIG. 2 of the drawings, a modification is illustrated which is similar to that previously described, except that four inertia rings are present instead of two. The numeral 50 denotes a hub rotatable about the axis of rotation 14, the outer radial surface of the hub carrying an elastomer band 52. Inertia rings 54, 56, 58, and 60 are secured to common elastomer band 52, the inner radial surfaces of these inertia rings preferably bonded to the elastomer, as the elastomer is to be the hub. Assembly radii are again employed, one such radius being denoted by the numeral 62 at the left innermost radial surface of inertia ring 54. Similar radii are formed in the remaining inertia rings, as illustrated. Also, annular grooves such as groove 64 are provided on the outer radial surface of hub 50 at corresponding axial locations, to thereby define grooves into which the radially deformed or compressed elastomer 52 is free to flow. At both axial ends of the damper there is no radial compression of the elastomer, as indicated by the bulges. Similarly, there is little or no radial deformation at the continuous annular grooves corresponding to 62 and 64, as well as those grooves not bearing a numeral. Again, each inertia ring is adapted to damp a specific frequency. The embodiment shown in FIG. 2 is also designed to provide near zero mass interaction and the additional concepts used for this end as described for two mass systems also apply.

Figure 3:
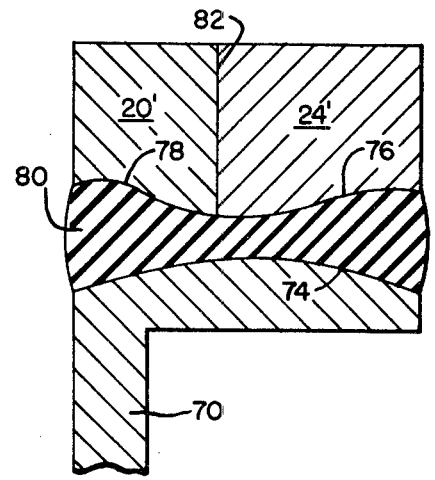
FIG. 3 is an embodiment demonstrating axial variation of rubber radial compression to produce dry friction mass interaction in a plural mass vibration damper employing a single elastic member.

Referring now to FIG. 3 of the drawings, another embodiment is illustrated which is similar to that of FIG. 1. The numeral 70 denotes a hub adapted to be attached to the crankshaft of an internal combustion engine. The radially outermost periphery (radial surface) of the hub is denoted by the numeral 74 and assumes the form of a convex surface in cross-section. The inertia ring members are denoted by 20' and 24' and have the indicated surfaces 76 and 78 at their inner radial portions. The numeral 80 denotes an elastomer band preferably bonded to both the hub and the inertia rings. The numeral 82 denotes the abutting axial interfaces of the two inertia rings. This embodiment is different from that shown in FIG. 1 in that the curved configuration of surfaces 74, 76 and 78 is utilized to axially vary elastomer deformation and hence the normal force against each other of abutting surfaces 82. Thus, the embodiment of FIG. 3 is designed to provide mass interaction which is sometimes desirable for a given system requiring a damper. The geometrical shapes of the interface surfaces 74 and 76, 78 may vary from the shapes shown in FIG. 3. The design considerations are as follows: The junction between the surfaces 76 and 78 should form a smooth transition of the annular cavity occupied after assembly by the elastic member. The radial compression of the elastic member after assembly should be a maximum at that axial position defining the interface between masses, and thus locally decrease in both axial directions from that position.

Figure 4:
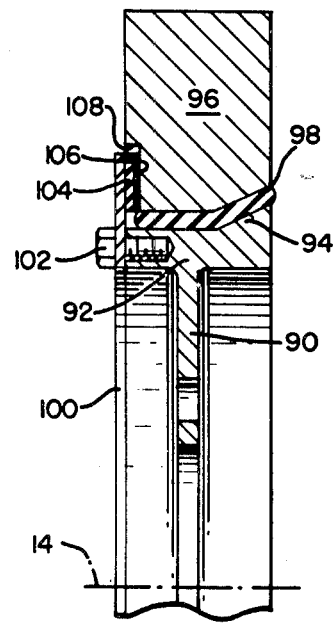
FIG. 4 is an embodiment demonstrating a series elastomeric-dry friction damping medium in parallel with a pure elastomeric medium to produce a non-linear damper characteristic.

Referring now to FIG. 4 of the drawings, an embodiment is illustrated which employs only a single inertia ring but which derives its damping action from not only the conversion of energy into heat by the elastomer, but also the conversion of energy into heat by an abrasive friction material. This latter action is termed dry friction in the art. The numeral 90 denotes a web portion of a hub 92, the hub adapted to be coupled to a rotating shaft as previously explained. The numeral 94 denotes a portion of hub 92 of greater radius than the remainder, the radially outermost periphery of the hub being defined by a generally cylindrical portion which merges with a conical portion. The numeral 96 denotes an inertia ring, preferably bonded at its innermost radial portions to elastomer band 98, the latter also preferably bonded to the outermost radial portion of the hub. The elastomer is compressed radially so that it bulges somewhat at its ends, as indicated. The numeral 100 denotes a flat ring or plate secured to the left face of the damper by means of a plurality of angularly spaced threaded fasteners 102, only one of which is illustrated. The outermost radial portion of plate 100 bears against an annularly continuous elastomer 104, also in the form of a flat ring or disc, in turn bearing against an abrasive friction material, such as common brake fabric for automobile brake drums, the former also in the form of a flat ring. The numeral 108 denotes an annular recess into which the elastomer 104 and friction material 106 are positioned. The elastomer disc 104 and friction material disc 106 define a non-linear coupling for rotary motion.

During operation, inertia ring 96 cooperates with the hub and elastomer member as in the previously-described manner to damp vibrations. When such relative motion is great enough, there is slippage between the friction material 106 and the inertia ring. This gives rise then to dry friction damping. No adhesive bond is needed between elastomer 104 and either the ring 100 or friction material 106, because the coefficient of friction between the inertia ring 96 (of metal) and the friction material is the least of the frictional coefficient of the three interfaces 100–104, 104–106, 106–96. Thus, additional energy of torsional vibration is converted into heat, additionally by the friction between friction material 106 and inertia ring 96. The outermost radial portion of ring 100 cooperates with inertia ring 96 to squeeze and sandwich the flat rings 104 and 106.

Figure 11:
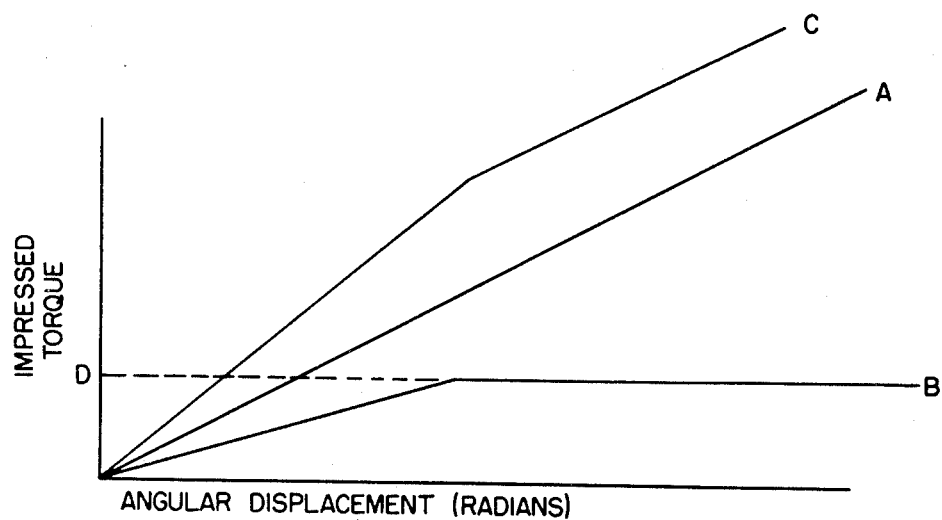
FIG. 11 illustrates linear and non-linear behavior of certain elements in, for example, FIG. 4 of the drawings.

The torsional spring defined by the composite of members 104 and 106 possesses by design a non-linear characteristic. That is to say, the torque transmitted through the spring does not result in a deflection of the spring (or relative angular motion between the interface between 100 and 104, and the interface between 106 and 96) that varies in direct linear proportion with that torque. The behavior is illustrated in FIG. 11. A linear torsion spring will exhibit a torque-displacement charateristic as shown by curve A, with the slope or first derivative of curve A representing the so-called spring rate, with typical units of inch pounds/radian. A spring as defined by the composite members 104 and 106 will exhibit a characteristic similar to the one shown as curve B in FIG. 11. As the torque across the spring is increased, the angular displacement between the axial extremities of the spring will increase in a linearly proportional fashion up to that torque that will break the frictional surface loose, and slipping begins, the torque required shown as D in FIG. 11. Slipping will continue with no further increase in torque and the torque displacement characteristic will take the form of the right-hand portion of curve B parallel to the displacement axis. Since the spring rate or slope of curve B is not constant with displacement, the spring defined by curve B is said to be non-linear. The damper defined by FIG. 4 has an additional torsion spring defined as the elastomer member 98. The spring 98, and the spring defined by the composite 104 and 106 are deployed in a parallel fashion, and thus the overall spring rate resisting the motion of inertia member 96 relative to hub 92 is the algebraic sum of the two spring rates. If the characteristic of spring 98 were defined as curve A in FIG. 11, and the composite defined as curve B, then the overall characteristic of the damper could be defined as curve C in FIG. 11. This non-linear damper spring rate has many desirable design features and performance features, and is the desired result of the embodiment shown in FIG. 4.

Figure 5:
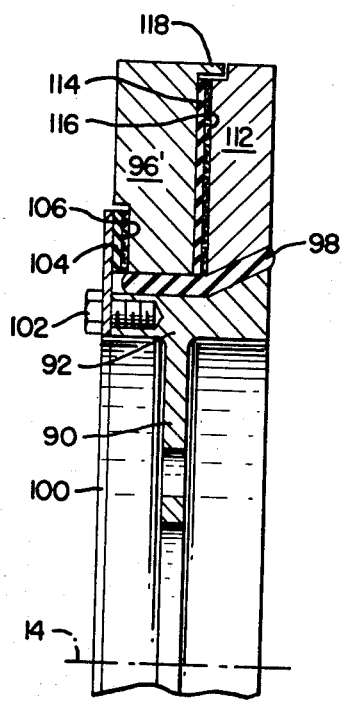
FIG. 5 is a view similar to FIG. 4 wherein two inertia members are employed and non-linear mass interaction is present due to a series elastomeric-dry friction damping medium between masses.

Referring now to FIG. 5 of the drawings, an embodiment is illustrated which utilizes the friction pad arrangement of FIG. 4 and the dual inertia ring construction of FIG. 1. In FIG. 5, the numeral 90 again represents the web of hub 92. Also as in FIG. 4, a cover plate 100 abuts a flat elastomer ring 104 and associated flat, friction material ring 106. The numeral 96' denotes a first inertia ring, similar in construction to the left half of inertia ring 96 of the embodiment of FIG. 4. The numeral 112 denotes a second inertia ring, similar in construction to the right-half of the inertia ring 96 of the embodiment of FIG. 4. The numeral 114 denotes a disc of elastomer material whose left face may be bonded to the right axial face of inertia member 96'. The right face of elastomer 114 abuts a flat ring of friction material 116, of a construction identical to that of friction material 106, previously described. A labyrinth seal member 118 integrally extends from inertia ring 96' into a complementary recess of ring 112. The numeral 98 again denotes an elastomer band preferably bonded to the hub and also to the inner radial periphery of inertia rings 96' and 112. The mode of operation of the embodiment of FIG. 5 is as follows. The two inertia rings are of different mass and accordingly each damps a different specific frequency of torsional vibration within the operating range of the engine. Also in a manner previously explained with respect to the sandwiched elastomer and friction fabric members 104 and 106 of FIG. 4, each of the elastomer disc-friction pad pairs 104–106 and 114–116 frictionally damps vibrations, and there is designed mass interaction.

Figure 6:
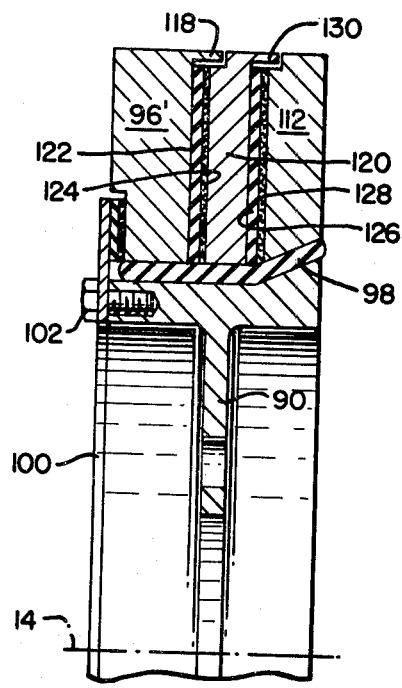
FIG. 6 is a view similar to FIG. 5 and illustrates the concept of FIG. 5 applied to three inertia members.

Referring now to FIG. 6 of the drawings, an embodiment is illustrated similar to that of FIG. 5, except that three inertia rings are employed. The embodiment of FIG. 6 may be viewed as similar to that of FIG. 5, with the exception of an additional inertia ring 120 sandwiched between inertia rings 96' and 112. The numeral 122 denotes an elastomer disc abutting an elastomer fabric material 124. A similar elastomer disc 126 is positioned at the right face of inertia ring 120, the elastomer also abutting a friction material disc 126. It is believed that the mode of operation of the embodiment of FIG. 6 will be obvious in view of the explanation of the previously described embodiments.

Figure 7:
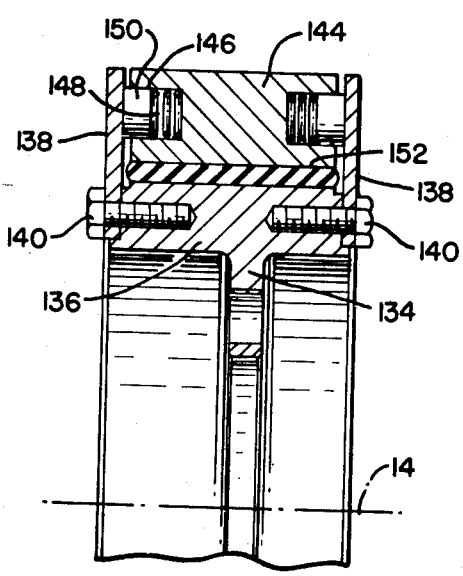
FIG. 7 is an embodiment demonstrating a parallel combination of elastomeric and dry friction damping mediums with the dry friction medium providing additionally lateral damper integrity.

Referring now to FIG. 7 of the drawings, still another embodiment is illustrated. The numeral 134 denotes the web portion of a hub 136, the hub adapted to be coupled to a crankshaft having an axis or rotation 14. Each axial face of the hub carries an abutment element in the form of a flat ring member 138 secured thereto by means of a plurality of angularly separated threaded fasteners 140, two of which are illustrated. The numeral 144 denotes an inertia ring whose two axial faces are each provided with a plurality of angularly spaced recesses 146. The innermost portion of each recess carries a resilient spring 148 and a friction member in the form of a piston 150. The springs 148 urge the friction members 150 into frictional contact with the innermost axial surfaces of abutment plates 138. The numeral 152 denotes an elastomer band which is radially compressed by the inertia member, both the radially innermost and radially outermost faces of the elastomer 152 preferably bonded to the respective ring and hub members.

The mode of operation of this embodiment will be apparent. Briefly, torsional vibrations result in relative rotation between hub 136 and inertia ring 144. This results in the generation of heat and consequent damping of torsional vibrations by elastomer 152. Additionally, such relative rotation results in a rubbing action between the friction piston members 150 and abutment plates 138. Such friction also serves to dampen the torsional vibrations. The embodiment of FIG. 7 is characterized by the utilization of dry friction, and elastomeric damping mediums in a parallel configuration, that is to say, the time averaged forces transmitted through each medium are not equal. This type of damping deployment is, again, of the type used by Krebs in U.S. Pat. No. 3,075,405. The improvement in the embodiment of FIG. 7 is in the mechanical technique of that deployment. The rubbing or dry friction interface is seen between elements 150 and 138. Since friction materials like brake lining are poor thermal conductors, the heat flow from the rubbing contact will be into the disc 138. By the nature of its thin axial profile it represents a good heat transfer fin. It is generally known to utilize fins to aid in cooling a high temperature body, because of the greater surface area provided to aid in heat conduction to the surrounding air. Friction contact on both axial extremes of the inertia member 144 form a mechanical lock against axial excursions of the inertia ring relative to the hub 134. Any additional foreign material that might tend to contaminate the friction surfaces as well as abraided material from the rubbing involvement itself will, through centrifugal forces arising from the high speed rotation of the part, tend to be ejected radially.

Figure 8:
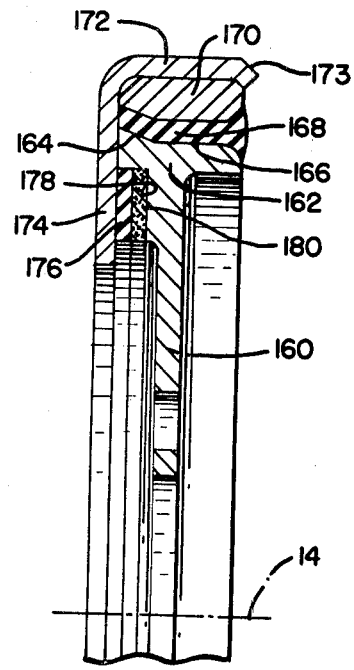
FIG. 8 is an embodiment demonstrating the concepts of FIG. 5 in a form more inexpensive to manufacture, and employing varying elastomeric cross-sectional geometry in conjunction with a series elastomeric-dry friction damping medium for lateral integrity.

Referring now to FIG. 8 of the drawings, another modification is illustrated which employs both elastomeric damping and friction pad damping in the exact manner of FIG. 4. The numeral 160 denotes the web portion of annular hub 162, the hub adapted to be attached to a crankshaft having an axis of rotation 14. The numeral 164 denotes a conical surface at the left portion of the outer rim of the hub, the numeral 166 denoting a cylindrical portion extending from the junction with conical portion 166 to the right-hand axial face of the torsional vibrational damper. The numeral 168 denotes an elastomer band carried on the outer radial portion of the hub, the band in turn carrying inertia ring 170. The right face of both the inertia ring and the hub is annularly chamfered as indicated. Preferbly, the elastomer band 168 is bonded to both the hub and the inertia ring and is radially deformed, as indicated by the bulge at the right-hand portion of the elastomer. The numeral 172 denotes the radially outermost portion of a clamping cup which is annularly continuous. The clamping cup includes dimpled portions 173 at angular locations around the plate, the dimples 173 being radially inwardly swaged so as to frictionally contact the indicated outermost portion of inertia ring 170. The clamping cup also includes a radially disposed portion 172, also angularly continuous, which carries on the indicated inside surface an elastomer ring or disc denoted by the numeral 176. A friction material ring or disc of the type previously described is denoted by the numeral 178. Both the elastomer ring 176 and friction material ring 178 fit in angularly continuous recess 180 at the left face of hub 162. Again, because of the different interface friction values, it is not necessary to bond the elastomer ring 176 to the metal portion 174, or to bond the friction material 178 to the elastomer 176.

During operation, the device functions as previously described with respect to the embodiment illustrated at FIG. 4 of the drawings. Inertia ring 170 cooperates with elastomer band 168 and the hub 162 to damp vibrations in a manner previously described. At relatively low torsional vibrations inertia forces, both elastomer 176 and friction material 178 will follow the vibrations. However, as torsional vibrational rotational forces increase, the lesser coefficient of friction between material 178 and the metal of hub 162 will result in relative motion between these two surfaces, while the greater coefficient of friction between the rubber and the friction material and between the rubber and the metal will inhibit relative rotation between these two portions. The result is the same as that which takes place in the embodiment of FIG. 4, previously described. However, no separate fastening means is required to position the elements in the indicated configuration, providing a simplified assembly.

What is claimed is:

1. A torsional vibration damper of the type having an annular hub adapted to be coupled to the crankshaft of an internal combustion engine to damp torsional vibrations thereof, the improvement comprising, a single elastomer annulus surrounding the outer radial periphery of the hub, a plurality of annular inertia rings each of whose inner peripheries engage the elastomer annulus and are carried by the elastomer annulus on the hub, the inertia rings being frictionally coupled to each other, each of the inertia rings capable of executing angular motion relative to an adjacent inertia ring.

2. The torsional vibration damper of claim 1 wherein the elastomer annulus is of substantially uniform radial thickness throughout substantially all of its axial extent.

3. The torsional vibration damper of claim 1 wherein each inertia ring is axially spaced from its next adjacent neighbor.

4. A torsional vibration damper of the type having an annular hub adapted to be coupled to the crankshaft of an internal combustion engine to damp torsional vibrations thereof, a single elastomer annulus surrounding the outer radial periphery of the hub, the improvement comprising, the outer radial surface of the hub increasing in diameter towards one axial face of the hub from a point on the said surface intermediate the axial faces of the hub, to thereby define a conical portion a plurality of annular inertia rings each of whose inner peripheries engages the elastomer annulus and are carried by the elastomer annulus on the hub, the inertia rings being frictionally coupled to each other, each of the inertia rings capable of executing angular motion relative to an adjacent inertia ring, one of said plurality of inertia rings having a conical inner radial periphery complementary to the said conical portion of the hub periphery and axially mounted therealong a flat elastomer ring and a substantially coextensive flat friction fabric ring sandwiched between and squeezed by the facing axial faces of said inertia rings.

5. The torsional vibration damper of claim 4, including a plate member secured to the hub, the plate member lying in a radial plane and having a portion radially coextensive with an endmost axial face of one of said inertia rings to define radially coextensive interfaces, a flat elastomer ring and a substantially coextensive friction fabric ring sandwiched between and squeezed by said radially coextensive interfaces.

6. The torsional vibration damper of claim 5, wherein said radially coextensive interfaces are located at that endmost axial face of the hub which is opposite to that endmost axial face of the hub which carries the said conical portion.

7. The torsional vibration damper of claim 5, wherein the endmost inertia ring, having said coextensive portion, is provided with an annular recess into which said last-mentioned, sandwiched elastomer and friction fabric members are at least partially positioned.

8. The torsional vibration damper of claim 5, wherein the radially outermost periphery of at least one of said plurality of inertia rings is provided with an integral, axially extending flange, which flange is received by an annular groove in the next adjacent inertia ring, whereby a labyrinth-type seal for the sandwiched, flat elastomer and friction fabric members is provided.

9. A torsional vibration damper of the type including an annular hub adapted to be coupled to the crankshaft of an internal combustion engine to damp torsional vibrations thereof, the improvement comprising, means coupling at least a pair of inertia rings to the hub for limited relative rotation with respect to the hub and with respect to each other, said means defined by a single elastomer annulus, a damping member sandwiched between and contacted by the said inertia rings, said damping member being free to execute back-and-forth vibrational motion relative to the hub, whereby torque to the other of said pair of inertia rings.

10. The torsional vibration damper of claim 9 wherein said damping member is a non-linear, elastic coupling.

11. The torsional vibration damper of claim 10 wherein said non-linear coupling includes an elastomer disc contacting a fabric friction material disc, both discs being sandwiched by said inertia rings.

* * * * *

UNITED STATES PATENT AND TRADEMARK OFFICE
CERTIFICATE OF CORRECTION

PATENT NO. : 4,262,553

DATED : April 21, 1982

INVENTOR(S) : Robert C. Bremer, Jr.

It is certified that error appears in the above-identified patent and that said Letters Patent is hereby corrected as shown below:

Column 12, line 14, after "torque" insert -- may be transmitted from one of said pair of inertia rings --.

Signed and Sealed this

Seventh Day of May 1985

[SEAL]

Attest:

DONALD J. QUIGG

Attesting Officer

Acting Commissioner of Patents and Trademarks